US012677048B2

(12) United States Patent
Hubert et al.

(10) Patent No.: US 12,677,048 B2
(45) Date of Patent: Jul. 7, 2026

(54) DEVICE FOR DETECTING AND TRACKING OBJECTS IN A ZONE OF INTEREST

(71) Applicant: ONX2 SAS, Paris (FR)

(72) Inventors: Christian Jean Jacques Hubert, Charenton le Pont (FR); Maurice Rebiffe, Paris (FR)

(73) Assignee: ONX2 SAS, Paris (FR)

( * ) Notice: Subject to any disclaimer, the term of this patent is extended or adjusted under 35 U.S.C. 154(b) by 176 days.

(21) Appl. No.: 18/690,907

(22) PCT Filed: Aug. 30, 2022

(86) PCT No.: PCT/FR2022/051628
§ 371 (c)(1),
(2) Date: Mar. 11, 2024

(87) PCT Pub. No.: WO2023/037062
PCT Pub. Date: Mar. 16, 2023

(65) Prior Publication Data
US 2024/0397171 A1    Nov. 28, 2024

(30) Foreign Application Priority Data

Sep. 9, 2021    (FR) ...................................... 2109428

(51) Int. Cl.
*H04N 23/16*        (2023.01)
*H04N 23/11*        (2023.01)
(Continued)

(52) U.S. Cl.
CPC ............. *H04N 23/16* (2023.01); *H04N 23/11* (2023.01); *H04N 23/61* (2023.01); *H04N 23/695* (2023.01)

(58) Field of Classification Search
CPC ........ H04N 23/16; H04N 23/11; H04N 23/61; H04N 23/695; G06V 10/141; G06V 10/147; G06V 10/12
See application file for complete search history.

(56) References Cited

U.S. PATENT DOCUMENTS

2010/0207036 A1*  8/2010  Massonneau ........ A61B 5/0059
                                                          250/459.1
2018/0003372 A1    1/2018  Rebiffe et al.
(Continued)

FOREIGN PATENT DOCUMENTS

FR          2001934 A1    10/1969
FR          3031569 A1    7/2016
(Continued)

OTHER PUBLICATIONS

Chen, Guang et al., "NeuroAED: Towards Efficient Abnormal Event Detection in Visual Surveillance With Neuromorphic Vision Sensor", IEEE Transactions on Information Forensics and Security, vol. 16, Sep. 14, 2020, pp. 923-936.
(Continued)

*Primary Examiner* — Tat C Chio
(74) *Attorney, Agent, or Firm* — Workman Nydegger

(57) ABSTRACT
A device for detecting and tracking objects in an area of interest, including: a control terminal receiving direction information relating to objects entering the area of interest from a radar or a direct input from an operator, a motorized yoke having 3 axes of rotation with direct axial drive for the support and the omnidirectional displacement of an assembly comprising: a neuromorphic camera, an IR laser module including a pulsed infrared laser source to illuminate the object to be identified, and an image processing module for obtaining, from an IR image received by the neuromorphic camera, event images of each of the objects present in the area of interest, for locating and identifying these objects
(Continued)

and for controlling the orientation of the motorized yoke in order to track their respective displacement in the area of interest on a display screen of the control terminal.

15 Claims, 5 Drawing Sheets

(51) Int. Cl.
  *H04N 23/61*          (2023.01)
  *H04N 23/695*         (2023.01)

(56)                References Cited

U.S. PATENT DOCUMENTS

| | | | | |
|---|---|---|---|---|
| 2018/0136550 | A1 | 5/2018 | Rebiffe | |
| 2019/0391254 | A1* | 12/2019 | Asghar | H04N 23/60 |
| 2020/0159092 | A1 | 5/2020 | Rebiffe | |
| 2023/0360230 | A1* | 11/2023 | Qian | G01S 3/7864 |
| 2025/0225665 | A1* | 7/2025 | Kenig | G06V 10/25 |

FOREIGN PATENT DOCUMENTS

| | | | |
|---|---|---|---|
| FR | 3034497 | A1 | 10/2016 |
| FR | 3065344 | A1 | 10/2018 |
| WO | 2020120782 | A1 | 6/2020 |
| WO | 2021089216 | A1 | 5/2021 |

OTHER PUBLICATIONS

Gallego, Guillermo et al., "Event-based Vision: A Survey", arXiv. org, Cornell University Library, Apr. 17, 2019, pp. 1-25.
French Search Report from corresponding French Patent Application No. FR2109428, May 16, 2022.
International Search Report from corresponding PCT Application No. PCT/FR2022/051628, Nov. 22, 2022.

* cited by examiner

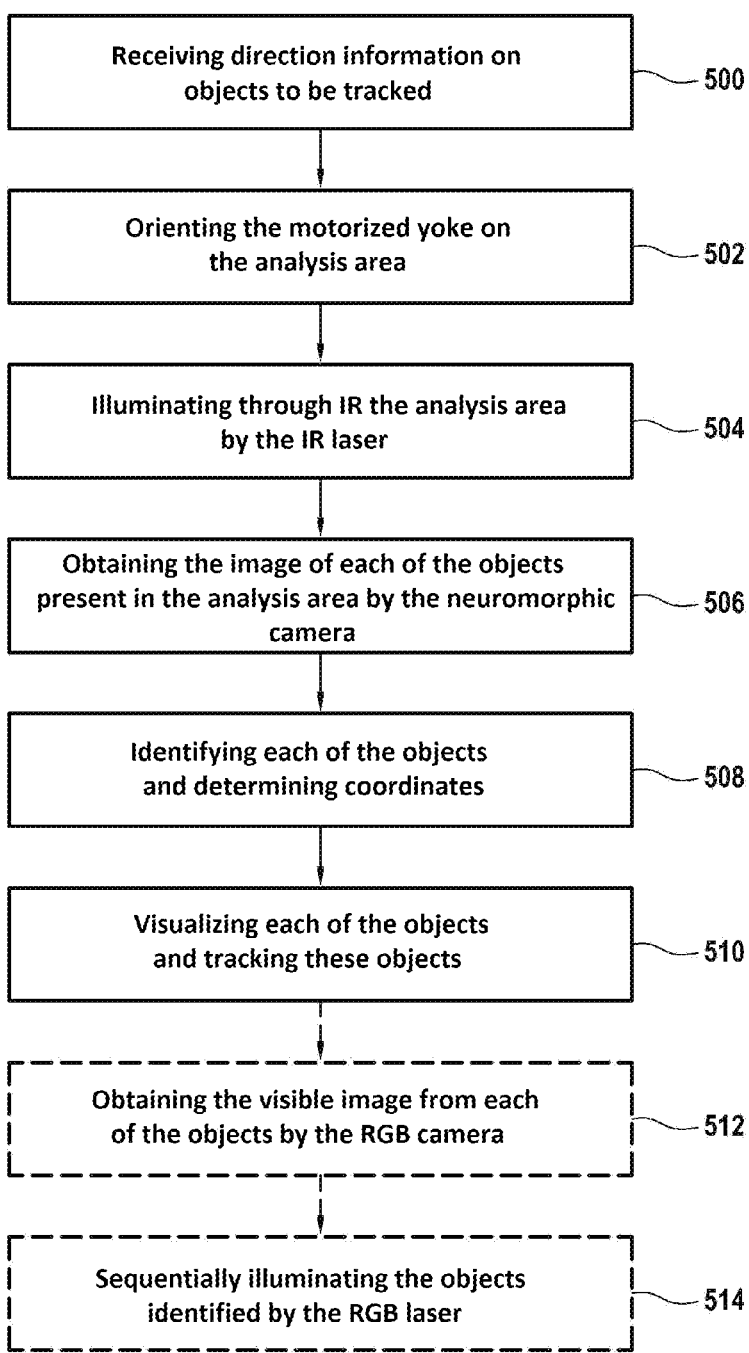

| Receiving direction information on objects to be tracked | 500 |

| Orienting the motorized yoke on the analysis area | 502 |

| Illuminating through IR the analysis area by the IR laser | 504 |

| Obtaining the image of each of the objects present in the analysis area by the neuromorphic camera | 506 |

| Identifying each of the objects and determining coordinates | 508 |

| Visualizing each of the objects and tracking these objects | 510 |

| Obtaining the visible image from each of the objects by the RGB camera | 512 |

| Sequentially illuminating the objects identified by the RGB laser | 514 |

FIG.8

DEVICE FOR DETECTING AND TRACKING OBJECTS IN A ZONE OF INTEREST

TECHNICAL FIELD

The present invention relates to the field of tracking objects in a determined area of interest and it more particularly concerns a device for detecting and tracking objects from the image of these objects.

PRIOR ART

The tracking of objects or people moving in a determined space is a difficult problem to solve. Systems based solely on the image recognition to ensure such tracking are not very efficient because they are particularly sensitive to lighting conditions. This is in particular the case when these objects are small and move in very diverse environments that traditional viewing and recognition methods cannot adequately grasp.

DISCLOSURE OF THE INVENTION

The present invention proposes to overcome these lighting conditions and to overcome the aforementioned drawbacks with a simple device allowing location, identification and tracking of objects without excessive constraints.
These Aims are Achieved with a Device for Detecting and Tracking Objects, Including:
  a control terminal receiving direction information relating to objects entering the area of interest from a radar or a direct input from an operator,
  a motorized yoke having 3 axes of rotation with direct axial drive for the support and the omnidirectional displacement of an assembly comprising:
    a neuromorphic camera, and
    an IR laser module including a pulsed infrared laser source to illuminate the object to be identified, and
    an image processing module for obtaining, from an IR image received by the neuromorphic camera, event images of the objects present in the area of interest, for locating and identifying these objects and for controlling the orientation of the motorized yoke in order to track their displacement in the area of interest on a display screen of the control terminal.
Thus, the illumination of the objects by the infrared laser module associated with the receipt of event images by the neuromorphic camera mounted on a motorized omnidirectional yoke allows the location, identification and tracking of the objects in all circumstances.
Advantageously, the detection and tracking device further includes a RGB laser module including a polychromatic laser source to emit a laser beam towards the identified object.
With this complementary module, it becomes possible both to light the object for better visual identification at night and, if necessary, to blind or destroy it.
Advantageously, the motorized yoke further includes a color or black and white camera forming with the neuromorphic camera two co-focused cameras with a common objective lens, and a dichroic mirror separating and directing the image collected through the common objective lens, on the one hand into a visible image towards the color or black and white camera and on the other hand into an IR image towards the neuromorphic camera.
Preferably, the pulsed infrared laser source is configured to deliver through a focusing lens a beam of pulsed IR light at the input of a square-core multimode optical fiber whose output after passage through a collimating lens is directed towards a sighting collimator whose objective lens forms the output objective lens of the IR laser module.
Advantageously, the polychromatic laser source is configured to deliver a beam of white light at the input of a sighting collimator whose output is connected to an angular scanning system directing the beam of white light successively towards each of the tracked objects.
Preferably, the polychromatic laser source is configured in order, depending on its light intensity level, to light, blind or destroy the at least one of the identified objects.
Advantageously, the sighting collimators are afocal optical systems with at least one first lens forming an eyepiece and at least one second lens forming an objective lens, the image focus of the first lens being coincident with the object focus of the second lens.
Preferably, the device further includes a GPS positioning module and a power supply and control module as well as a radio or light data communication module.
The invention also relates to a network for detecting and tracking objects, including at least two aforementioned devices in radio or light communication with each other and with a common control terminal.
The invention also relates to a method for detecting and tracking objects in a predetermined area of interest including:
  receiving, at a control terminal, direction information relating to objects entering the area of interest,
  orienting a motorized yoke supporting at least one IR laser module including a pulsed infrared laser source and a neuromorphic camera, towards the area of interest,
  illuminating the area of interest using the IR laser module,
  obtaining an event image of each of the objects present in the area of interest of an IR image received by the neuromorphic camera, and
  identifying and determining the coordinates of each of the objects identified from their event image and tracking their respective displacement in the area of interest on a display screen of the control terminal.
Preferably, the method further includes obtaining, by a color or black and white camera forming with the neuromorphic camera two co-focused cameras with a common objective lens, a visible image of the objects present in the area of interest.
In one preferred embodiment, it further includes sequentially illuminating by a RGB laser module the different identified objects in order, depending on a light intensity level of a polychromatic laser source of the RGB laser module, to successively light, blind or destroy at least one of the tracked objects.
Advantageously, the direction information is received from a radar or entered directly by an operator.
Preferably, the identification of the objects is obtained by shape recognition software through deep learning.

BRIEF DESCRIPTION OF THE DRAWINGS

The characteristics and advantages of the present invention will emerge better from the following description, given for informational and non-limiting purposes, in relation to the appended drawings in which:
FIG. 8 shows the different steps of the object detection and tracking method according to the invention.

DESCRIPTION OF THE EMBODIMENTS

To accurately define the location and allow the tracking of objects moving on a particular area of interest, the invention proposes to mount a neuromorphic camera in a motorized support with three axes of rotation, perpendicular in pairs, of the yoke type and to associate it with an IR laser in order to detect in real time any object appearing in the area of interest and track its displacement in this area. The additional association of a traditional video camera and of a RGB laser further allows better identification of the detected object and blinding of this object when it is desired.

Figure 1:
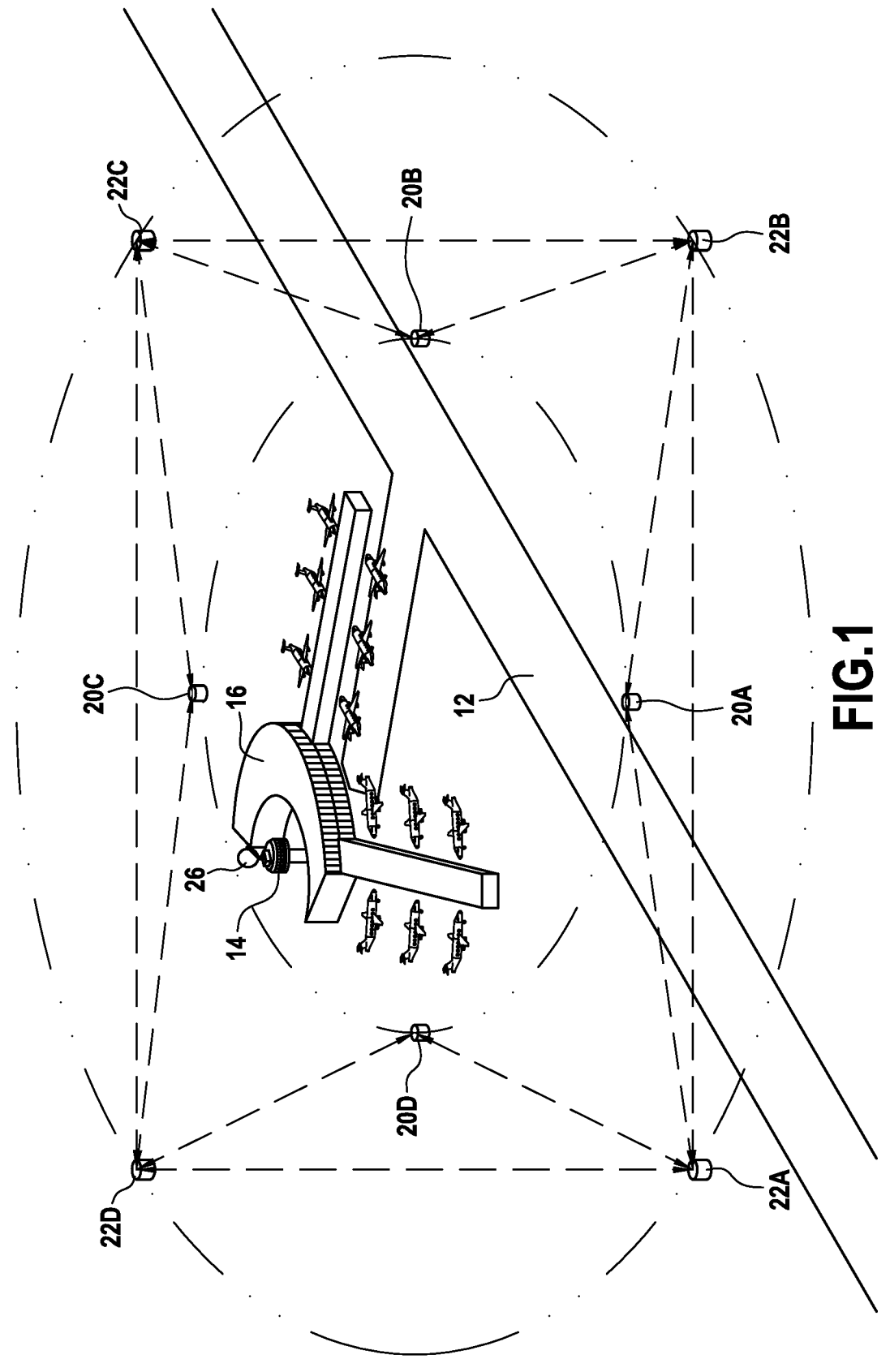
FIG. 1 is a schematic view of an area of interest including a mesh network of object detection and tracking devices according to the invention.

FIG. 1 illustrates an example of an area of interest centered on an aerodrome 10 likely to be flown over by identified flying objects such as a registered aircraft equipped with its transponder, or unidentified flying objects such as a bird, a microlight or a drone. Traditionally, this aerodrome includes a landing runway 12, a control tower 14 and various halls and buildings 16.

In accordance with the invention, several detection and tracking devices are disposed all around the aerodrome in several concentric circles (currently two without this number being limiting), in this case four devices 20A, 20B, 20C, 20D, as close as possible to the runways and four other devices 22A, 22B, 22C, 22D within a radius of about 500 meters from the first ones (without this distance itself being limiting), the area of interest being able to be considered as the one disposed in a additional radius of 500 meters compared to the first previous circle, i.e. in the illustrated example about 1 km from the center of the aerodrome. These devices are in radio or light link with each other and with a control terminal 24 advantageously disposed in the control tower 14, so as to create a "spider web" type network, the choice of either of these communication technologies depending on the configuration of the area of interest. By radio link, it is meant a Wi-Fi type link or the like and by light link, it is meant a Li-Fi type link. Such a mesh network organized in concentric circles easily allows the simultaneous detection of several objects of only a few tens of centimeters at distances of several kilometers, this detection being able to be carried out by a single motorized yoke or by several yokes directed towards the same group of objects.

As is known, the aerodrome is equipped with a Doppler radar 26 or any other type of similar radar such as a Lidar, advantageously disposed at the level of the control tower 14, to track the approaching aircrafts and identify them from their transponder communicating their coordinates in real time in response to an interrogation from the control tower. The devices further each include a GPS positioning module 200 (see FIG. 2) allowing them, after an initial calibration, to be positioned relative to each other and to the Doppler radar (by using, if necessary, a compass, an altimeter or a telemeter ensuring a spatio-temporal reference frame).

Figure 2:
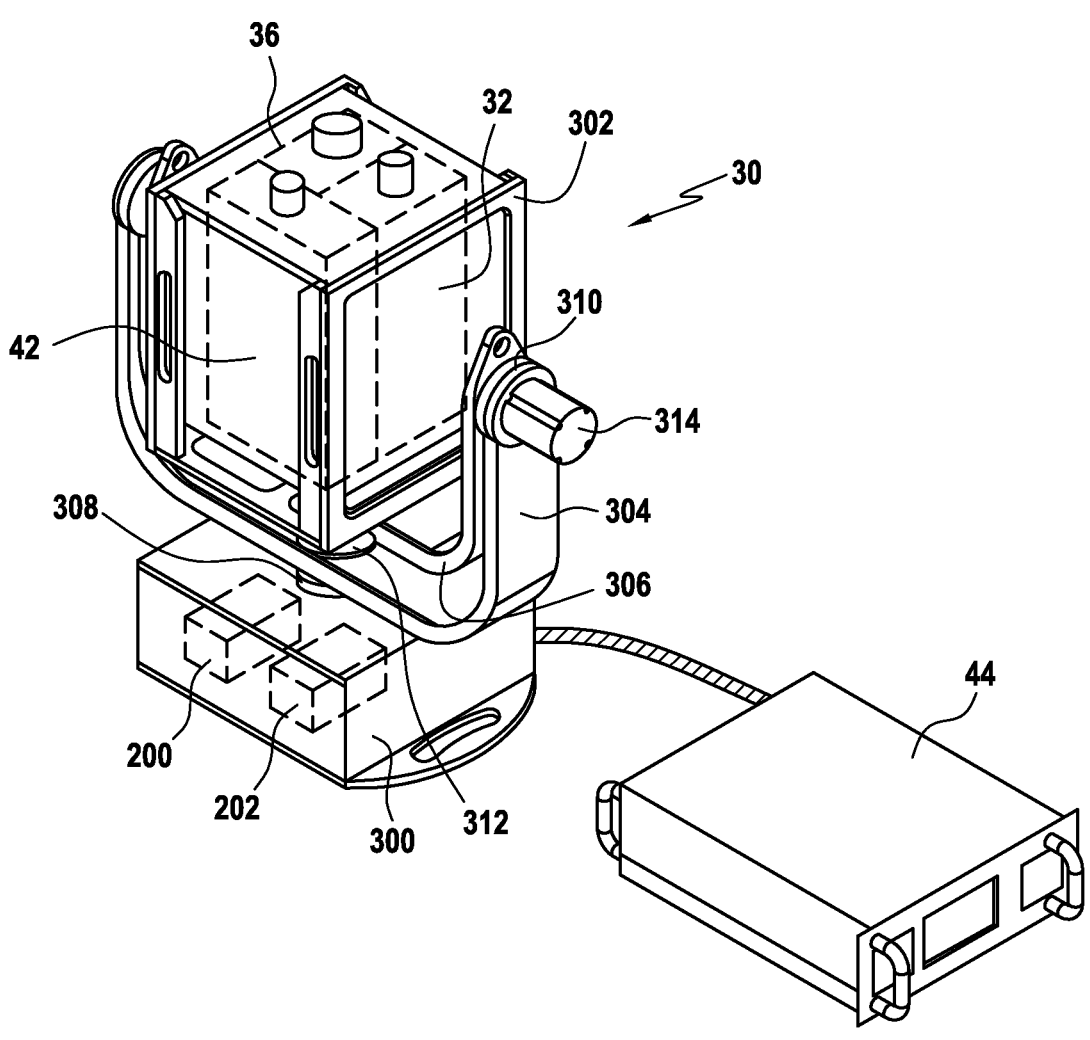
FIG. 2 is a view of a device according to the invention of the network of FIG. 1.

FIG. 2 illustrates an example of a device 20A, 20B, 20C, 20D, 22A, 22B, 22C, 22D for detecting and tracking, in connection with an outer image processing module 28, the omnidirectional displacement of the objects that the doppler radar 26 will have spotted as entering the area of interest. The image processing module 28 can be any type of computer or microprocessor calculator including for example a video controller provided with appropriate image processing software known to those skilled in the art.

Figure 3:
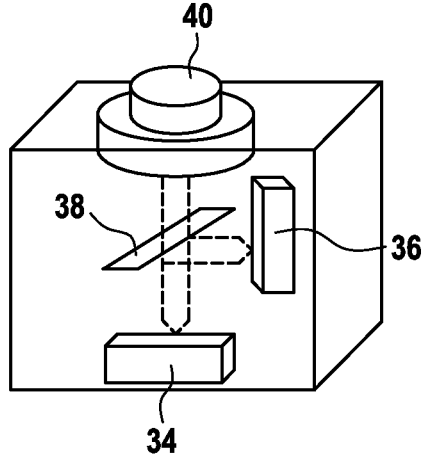
FIG. 3 illustrates an example of two co-focused cameras of the device of FIG. 2.

Each detection and tracking device consists of a motorized yoke 30 ensuring a rotation along three perpendicular axes in pairs (Tilt, Pan, Roll) and supporting an IR laser module 32 and a neuromorphic camera 36. Depending on the Application implemented and as shown in FIG. 3, the device can also include a color or black and white camera 34 forming with the neuromorphic camera 36 two co-focused cameras receiving images through a dichroic filter 38 and including a common objective lens 40 ensuring zoom and focus. This assembly is also provided with a bandpass filter whose bandwidth is variable to allow optimization of the contrast. A RGB laser module 42 can also be mounted on the motorized yoke and therefore move with it. However, it can be entirely envisaged for this RGB laser module to be mounted on an outer support or a second motorized yoke that would receive the coordinates of the objects from the first yoke.

Let's return to FIG. 2. The motorized yoke advantageously portable yoke (its weight is less than 30 Kg) and intended to receive in a support frame 302 the cameras/laser module(s) assembly, includes two "L"-shaped arms 304, 306 each having a first and a second end, the first end 304A of the first arm 304 being connected to a base 300 at the level of a first vertical axis of rotation (horizontal "Pan" axis 308) and the second end 304B of the first arm 304 being connected to the first end 306A of the second arm 306 at the level of a second horizontal axis of rotation (vertical "Tilt" axis 310) perpendicular to the first vertical axis of rotation 308, the second end 306B of the second arm 306 being connected to the support frame 302 at the level of a third vertical axis of rotation 312 perpendicular to the second horizontal axis of rotation ("Roll" axis 310) and coaxial (in its rest position) to the first vertical axis of rotation 308. Each axis of rotation 308, 310, 312 is motorized by a motor-reduction gear assembly (for example 314) in direct engagement with this axis of rotation (direct axial drive), that is to say without a pulley or belt generating vibrations (jolts during accelerations or decelerations) and significant hysteresis (or backlash). The motors are typically stepper type motors or for example brushless direct current motors advantageously provided with an electromagnetic brake and the reduction gears are very high-accuracy moto-reduction assemblies of the elliptical reduction gear type from the company Harmonic Drive® for example whose accuracy is advantageously comprised between 15 and 30 Arc second (i.e. between 0.004 and) 0.0083°. The range of displacement of the axes of rotation is typically 360° on the "Pan" axis, 270° on the "Tilt" axis and 180° on the "roll" axis which allows switching from a landscape mode to a portrait mode and vice versa.

Furthermore, it is also possible to manage, via the control of the motorized yoke, zoom 328 and focus 330 motors of the common objective lens 40 of the two cameras.

Of course, if this L-shaped configuration of the motorized yoke is preferred, a more traditional and symmetrical U-shaped configuration can also be envisaged. In this case, only one of the two ends of the U-shaped arm is preferably motorized, the other can then be freewheel mounted on a simple non-motorized axis of rotation.

The motorized yoke, whether with a single (L) or double (U) arm, achieves a perfect balance of masses with a center of gravity that allows supporting high weights (from 20 to more than 100 Kg) without significant lever arms and therefore ensures perfect mechanical servo-control without vibrations and with exceptional placement accuracy, movement quality and repeatability. This balanced structure allows the motorized yoke to be used in any position, laid on its base on the ground, such as suspended or even kept offset laterally. Reference will advantageously be made to the Application FR20 01934 for more details.

The color or black and white camera 34 implemented in the invention is known per se and it is therefore not necessary to describe it in detail. Let us just note that it includes at least one sensor (a color camera with three RGB sensors is also possible) which can be with CMOS or EMCCD technology (see for example the color cameras of the IK-M series from the company Toshiba).

The neuromorphic camera 36 is also known per se and is for example described in the Application WO2020/120782 on behalf of the company Prophesee. It has the particularity of allowing the identification and tracking of objects based on an array of event sensors (event-based sensor) which delivers events asynchronously and beyond a predetermined threshold according to the variations in the parameters (intensity, luminance, reflectance) of the light received on this array of sensors. By processing on each image only a small amount of information, it benefits from negligible processing latency compared to a conventional camera and can process 20,000 images per second when a conventional camera processes only 200 of them. It therefore allows detection in all circumstances thanks to its time response of the order of 50 microseconds and its exceptional light detection dynamics of 120 dB (to compare to the 40 dB of a conventional camera).

As shown in FIG. 3, the dichroic mirror 38 is disposed 45° behind the common objective lens 40 in the optical axis of the color or black and white camera. It receives the image of the object which on the one hand, by crossing it, will be directed towards the camera 34 and on the other hand, by returning perpendicularly to this optical axis, will be directed towards the neuromorphic camera 36. To let the visible image pass towards the color or black and white camera, the dichroic mirror includes a transmission wavelength band comprised between 400 and 700 nm and to reflect the infrared image towards the neuromorphic camera includes a rejection wavelength band comprised between 700 and 900 nm.

Figure 4:
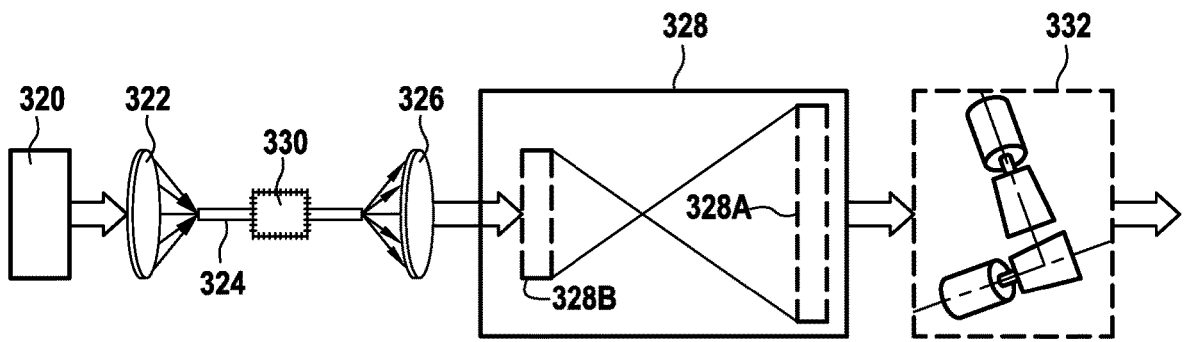
FIG. 4 illustrates an example of the IR laser module of the device of FIG. 2.
Figure 5:
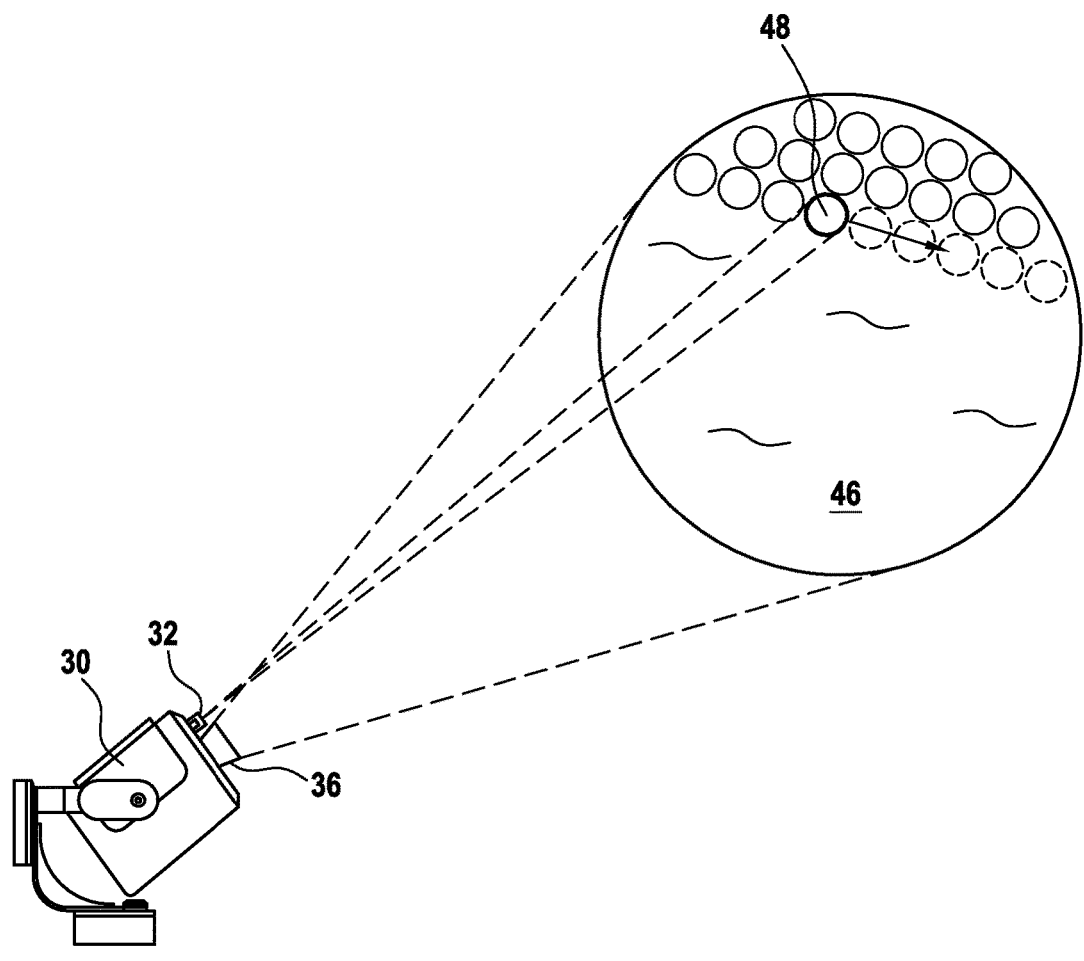
FIG. 5 shows the sequencing of the IR illumination on the area of interest.

The IR laser module 32 is illustrated more specifically in FIG. 4. It includes an infrared laser source (320) with a power comprised between 10 and 400 Watts and typically between 20 and 100 Watts which delivers through a focusing lens 322 an IR light beam of a wavelength comprised between 800 and 975 nm at the input of a multimode optical fiber 324 whose output after passage through a collimating lens 326 is directed towards a sighting collimator 328 whose objective lens 328A forms the output objective lens of the IR laser module 32. The multimode optical fiber includes a square core which provides a uniform light intensity profile of the "flap-top/Top-Hat" type and can also advantageously include a device against the speckle (antispeckle 330). The square-core fiber, by providing very high contrast and sharp focus to infinity, allows extremely accurate (20 cm to 2 km) and very long-range (up to 5 kilometers) IR illumination for a given magnification in order to concentrate the light intensity as much as possible on the object according to its distance. It is thus possible to obtain illumination centered on the object or wider covering a cone similar to that of the Doppler radar. Alternatively, this illumination centered on the object can also be obtained with better accuracy by having at the output of the IR laser module 32 a scanning system 332 of the galvanometric mirror scanner motor type ensuring horizontal and vertical scanning (of the raster type) at a frequency from 500 Hz to 2 KHz. As shown in FIG. 5, with such a mirror system, it becomes possible to direct sequentially (following a predefined path illustrated by the arrow) the IR light beam 48 coming from the IR laser module 32 towards each of the objects of the area of interest 46 lighted by the neuromorphic camera 36.

Figures 6, 7:
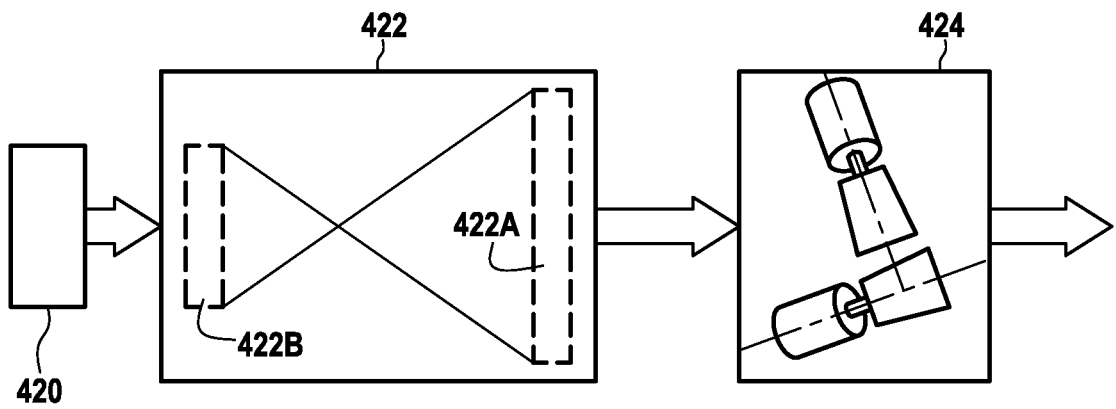
FIG. 6 illustrates an example of the RGB laser module of the device of FIG. 2.
FIG. 7 illustrates an example of the mesh network of devices of FIG. 1.

The RGB laser module 42 is illustrated more specifically in FIG. 6. It includes a polychromatic laser source (420) with a power comprised between 10 and 200 Watts and typically 160 Watts which delivers a beam of white light from 2,400 to 9,600 K of wavelength comprised between 400 and 700 nm at the input of a sighting collimator 422 whose output is connected to an angular scanning system 424, of the galvanometric mirror scanner motor type, successively directing, at the output of the RGB laser module 42, the beam of light towards each of the tracked objects. The polychromatic laser source advantageously includes at least two and preferably three levels of light intensity allowing, depending on this level, a simple illuminance (class 1 intensity) for obtaining a visible image of the object, a blinding (class 3 intensity) of the object or a destruction of the object (class 4 intensity).

The sighting collimators, traditionally of the Galilean telescope type, are afocal optical systems (refracting telescope) with at least one first lens 328B, 422B forming an eyepiece and at least one second lens 328A, 422A forming an objective lens, the image focus of the first lens being coincident with the object focus of the second lens. Such collimators traditionally allow magnifications of 50 times and more.

The infrared 320 or polychromatic 420 high-power laser sources can for example be of the type of those described in the Applications FR3031569 and FR3034497. When the powers involved are very high and significant heat dissipation at the level of the motorized yoke cannot be envisaged, the laser source can be offset in an outer module 44 as illustrated in FIG. 2 and taught in the Application FR3065344.

FIG. 7 shows an example of protection of a site of interest by the detection and tracking of objects overflying this site by means of a protection network formed of two detection and tracking devices each including a motorized yoke 30A, 30B directed so as to best cover all or part of the space to be monitored above this site. In the base of each motorized yoke, there is represented the GPS positioning module 200 and a power supply and control module 202 necessary for supplying voltage and controlling the displacement of the motorized yoke on its different axes according to data transfer protocols known as RS485, DMX512, Art-Net or PSN (Position Stage Net). A radio or light data communication module 280 ensuring the radio or light link with the control terminal 24 is represented at the level of the outer image processing module 28 which preferably communicates by wire link with the motorized yokes. However, in particular when the detection and tracking device is unique, the base of the motorized yoke can then integrate the image processing module and the communication module for direct communication with the control terminal.

The operation of the invention illustrated by the steps of the method of FIG. 8 will now be described with reference to the previous example of FIG. 7 which shows a sensitive site protected by two devices according to the invention disposed for example at two ends of this site and in connection with a common control terminal 24 disposed on the site itself or outside of it and displaying on one of its monitors 242 the radar image resulting from the 360° rotation of a Doppler radar (illustrated in FIG. 1 and for example external to the site to be protected) scanning the space to be monitored above this site.

Receiving direction information from this Doppler radar reporting on the monitor 242 the entry of one or more flying objects within its radius of action and giving its or their coordinates (distance and azimuth) and possibly its identification if it is an aircraft provided with a transponder, constitutes the first step 500 of the method of the invention.

In a second step 502, based on the information on the object communicated to the tracking device, the motorized yoke is oriented towards a determined area of space where this or these identified or unidentified object(s) to be monitored is/are located, this area being more or less wide depending on the number of objects concerned and which may or may not overlap that of the Doppler radar. This orientation of the motorized yoke which is advantageously communicated in return (the values of the angles of "Pan", "Tilt" and "Roll") to the control terminal 24, obviously involves that of the common objective lens 40 of the cameras and that of the lasers it supports towards this same determined area of the space to be monitored. When several objects are reported coming from opposite directions, it is appropriate to orient a first motorized yoke towards an area of the space and a second motorized yoke towards an opposite area of this space but, when a large number of objects come from the same direction, it is on the contrary appropriate to direct the two motorized yokes in this single direction. It should however be noted that when the direction information is obtained directly by an operator equipped with simple binoculars and not by the radar, the orientation of the motorized yoke can be performed directly at the control terminal by means of a simple joystick or a trackball or via the input of longitude/latitude coordinates.

The third step 504 of the method consists in illuminating the determined area of the space to be monitored where the object(s) is/are located by the infrared laser source whose operation can be continuous or more advantageously pulsed (that is to say modulated at a frequency from 10 Hz to 100 KHz with a duty cycle from 10 to 120%). This IR illumination makes it possible to create light contrasts on the impacted object which will thus better stand out from its environment and facilitate the processing of the images by the neuromorphic camera. In the case of a single motorized yoke, this illumination must then correspond at least to the radius of action of the Doppler radar, whereas if there are for example two tracking devices, each illumination must be able to cover the area of interest of each of the two motorized yokes.

In the fourth step 506, the neuromorphic camera 36, through image analysis based on asynchronous events, will obtain an event image of each of the objects present in its field of view and previously illuminated by the IR laser module and, via the image processing module 28, will identify each of these objects and determine the accurate coordinates in a following step 508. This identification is performed by using image recognition software and a known deep learning algorithm (for example the deep learning algorithm from the company Bionomeex) which can differentiate a microlight or a drone from a bird and identify them with a success rate greater than 90%. It will be noted that the use of a pulsed infrared laser source for the illumination of the object makes it possible to create in all circumstances a detectable event for the neuromorphic camera, day or night, whereas a fixed object such as a drone in stationary mode, is undetectable by the Doppler radar or by the single neuromorphic camera unless it is provided with specific means of action on the common objective lens 40 like those described in the Application WO2021/089216.

In a following step 510, the coordinates of each of the identified objects are time-stamped with the images sent to the control terminal 24 for a display and a tracking of these objects on the display screen 244.

In case of doubt about the identification, it is always possible to use the color or black and white camera 34 in a step 512 to obtain a visible image of each of the identified or unidentified objects. However, when it is dark, it is preferable to first resort to the illumination of the object by means of the RGB laser module 42 whose polychromatic laser source is then selected at its first level (class 1) corresponding to simple illuminance. This achievement of a visible image of the object makes it possible to confirm the presence of the object and to locate it in its environment after having been detected by the neuromorphic camera.

The tracking of the objects allows in a final step 514 the operator stationed in front of the control terminal to decide on the action to be taken in case one or more of these objects would be likely to endanger the operation or the security of the protected site. This could for example involve sending birds of prey to scare away migratory birds or battering-ram drones to hit malicious drones. It is also possible to use the RGB laser module 42 which can send through the galvanometric mirror scanner 424 successively (a frequency of 500 Hz allows for example to sequentially illuminate 6 to 8 objects) a beam of white light on each of the malicious drones in order, depending on the intensity level of the polychromatic laser source, to blind (class 3 level) the detection optics or even destroy it (class 4 level). It will be noted that this illumination in visible therefore multi-spectral light makes any drone protection based on a simple dichroic filter ineffective.

The invention claimed is:

1. A device for detecting and tracking objects in an area of interest, including:

a control terminal receiving direction information relating to objects entering the area of interest from a radar or a direct input from an operator, a motorized yoke having 3 axes of rotation with direct axial drive for support and omnidirectional displacement of an assembly, wherein each axis of rotation is motorized by a motor-reduction gear assembly in direct engagement with the axis of rotation, the motorized yoke being able to move the assembly based on the information communicated by the control terminal, the assembly comprising:

a neuromorphic camera, and an IR laser module including a pulsed infrared laser source to illuminate the object to be identified, and an image processing module for obtaining, from an IR image received by the neuromorphic camera, event images of each of the objects present in the area of interest, for locating and identifying these objects and for controlling orientation of the motorized yoke in order to track their respective displacement in the area of interest on a display screen of the control terminal.

2. The device according to claim 1, further including a RGB laser module including a polychromatic laser source to emit a laser beam towards the identified object.

3. The device according to claim 1, wherein the motorized yoke further includes a color or black and white camera forming with the neuromorphic camera two co-focused cameras with a common objective lens, and a dichroic mirror separating and directing the image collected through the common objective lens into a visible image towards the color or black and white camera and into an IR image towards the neuromorphic camera.

4. The device according to claim 1, wherein the pulsed infrared laser source is configured to deliver through a focusing lens a beam of pulsed IR light at the input of a square-core multimode optical fiber whose output after passage through a collimating lens is directed towards a sighting collimator whose objective lens forms the output objective lens of the IR laser module.

5. The device according to claim 2, wherein the polychromatic laser source is configured to deliver a beam of white light at the input of a sighting collimator whose output is connected to an angular scanning system directing the beam of white light successively towards each of the tracked objects.

6. The device according to claim 5, wherein the polychromatic laser source is configured in order, depending on its light intensity level, to light, blind or destroy the at least one of the identified objects.

7. The device according to claim 4, wherein the sighting collimators are afocal optical systems with at least one first lens forming an eyepiece and at least one second lens forming an objective lens, an image focus of the first lens being coincident with the object focus of the second lens.

8. The device according to claim 1, further including a GPS positioning module and a power supply and control module.

9. The device according to claim 1, further including a radio or light data communication module.

10. A network for detecting and tracking objects, including at least two devices according to claim 9 in radio or light communication with each other and with a common control terminal.

11. A method for detecting and tracking objects in a predetermined area of interest including:

receiving, at a control terminal, direction information relating to objects entering the area of interest from a Doppler radar or a direct input from an operator, orienting a motorized yoke having 3 axes of rotation with direct axial drive and supporting at least one IR laser module including a pulsed infrared laser source and a neuromorphic camera, towards the area of interest based on the information communicated by the control terminal, wherein each axis of rotation is motorized by a motor-reduction gear assembly in direct engagement with the axis of rotation, illuminating the area of interest using the IR laser module, obtaining an event image of each of the objects present in the area of interest of an IR image received by the neuromorphic camera, and identifying and determining coordinates of each of the objects identified from their event image and tracking their respective displacement in the area of interest on a display screen of the control terminal.

12. The method according to claim 11, further including obtaining, by a color or black and white camera forming with the neuromorphic camera two co-focused cameras with a shared objective lens, a visible image of the objects present in the area of interest.

13. The method according to claim 11, further including sequentially illuminating, by a RGB laser module, different identified objects in order, depending on a light intensity level of a polychromatic laser source of the RGB laser module, to light, blind or destroy at least one of the tracked objects.

14. The method according to claim 11, wherein the direction information is received from a radar or entered directly by an operator.

15. The method according to claim 11, wherein identification of the objects uses shape recognition software through deep learning.

\* \* \* \* \*